(12) United States Patent
Geng et al.

(10) Patent No.: US 9,103,524 B2
(45) Date of Patent: Aug. 11, 2015

(54) IMMERSIVE DISPLAY WITH MINIMIZED IMAGE ARTIFACTS

(71) Applicant: Corning Incorporated, Corning, NY (US)

(72) Inventors: Ying Geng, Painted Post, NY (US); Jacques Gollier, Painted Post, NY (US)

(73) Assignee: CORNING INCORPORATED, Corning, NY (US)

( * ) Notice: Subject to any disclaimer, the term of this patent is extended or adjusted under 35 U.S.C. 154(b) by 61 days.

(21) Appl. No.: 14/068,402

(22) Filed: Oct. 31, 2013

(65) Prior Publication Data

US 2014/0126183 A1  May 8, 2014

Related U.S. Application Data

(60) Provisional application No. 61/721,785, filed on Nov. 2, 2012, provisional application No. 61/783,495, filed on Mar. 14, 2013.

(51) Int. Cl.
| | | |
|---|---|---|
| *G09F 13/04* | (2006.01) | |
| *G09F 13/18* | (2006.01) | |
| *F21V 5/02* | (2006.01) | |
| *G02F 1/1333* | (2006.01) | |

(Continued)

(52) U.S. Cl.
CPC . *F21V 5/02* (2013.01); *G02B 5/045* (2013.01); *G02B 27/1066* (2013.01);

(Continued)

(58) Field of Classification Search
CPC ..... F21V 5/02; G02F 1/13336; G02F 1/1335; G02F 1/133509; G02F 1/133542; G02F 1/133605; G02F 1/133526; G02F 2001/133388; G02F 2001/133562; G02F 2001/133607; G02F 2203/62; G02B 27/1066; G02B 5/045; H04R 1/028; H04R 7/12; H04R 2499/15; G06F 1/1609; G06F 1/1641
USPC ............ 345/1.1–1.3, 102, 690–694; 359/619, 359/629–630; 362/97.1, 97.2, 97.3, 97.4, 362/317, 339
See application file for complete search history.

(56) References Cited

U.S. PATENT DOCUMENTS 5,828,410 A * 10/1998 Drapeau ........................ 348/383
6,023,316 A *  2/2000 Yano ............................. 349/112

(Continued)

FOREIGN PATENT DOCUMENTS

JP   2003050554 A   2/2003
WO  2010095486      8/2010

OTHER PUBLICATIONS

PCT-Notice—International Searching Authority—Invitation to pay additional fees and where applicable protest fee—Dated Feb. 28, 2014.

*Primary Examiner* — Anne Hines
*Assistant Examiner* — Jose M Diaz
(74) *Attorney, Agent, or Firm* — Kevin M. Able

(57) ABSTRACT

Methods and apparatus provide for a display device comprising a plurality of display panels arranged adjacent to one another along the respective peripheral edges thereof, and wherein respective first and second viewing planes form an obtuse angle T relative to each other. The display device further includes a cover sheet located in proximity to, and covering the first and second viewing planes, and includes a light compensation portion located proximate to the peripheral edges of the first and second flat panel displays, and has a curvature complementary to the obtuse angle between the respective first and second viewing planes. The light compensation portion bends light produced by respective peripheral areas of the first and second flat panel displays proximate to the respective peripheral edges thereof to reduce visual discontinuities introduced by the peripheral edges into an image displayed on the first and second flat panel displays.

20 Claims, 14 Drawing Sheets

(51) Int. Cl.
  *G02F 1/1335* (2006.01)
  *G02B 27/10* (2006.01)
  *G02B 5/04* (2006.01)
  *G06F 1/16* (2006.01)
  *H04R 1/02* (2006.01)
  *H04R 7/12* (2006.01)
  *H04R 7/04* (2006.01)
  *H04R 7/06* (2006.01)

(52) U.S. Cl.
  CPC ......... *G02F 1/1335* (2013.01); *G02F 1/13336* (2013.01); *G06F 1/1609* (2013.01); *G06F 1/1641* (2013.01); *G02F 1/133509* (2013.01); *G02F 1/133524* (2013.01); *G02F 1/133605* (2013.01); *G02F 2001/133388* (2013.01); *G02F 2001/133562* (2013.01); *G02F 2001/133607* (2013.01); *G02F 2203/62* (2013.01); *H04R 1/028* (2013.01); *H04R 7/045* (2013.01); *H04R 7/06* (2013.01); *H04R 7/12* (2013.01); *H04R 2499/15* (2013.01)

(56) References Cited

U.S. PATENT DOCUMENTS

| | | | |
|---|---|---|---|
| 6,473,220 B1 | 10/2002 | Clikeman et al. | 359/247 |
| 6,483,482 B1* | 11/2002 | Kim | 345/3.1 |
| 6,927,908 B2* | 8/2005 | Stark | 359/449 |
| 7,345,824 B2 | 3/2008 | Lubart et al. | 359/641 |
| 8,368,729 B2 | 2/2013 | Watanabe | 345/690 |
| 8,531,351 B2* | 9/2013 | Choi | 345/1.3 |
| 2003/0231144 A1 | 12/2003 | Cho et al. | |
| 2006/0077544 A1* | 4/2006 | Stark | 359/448 |
| 2009/0059366 A1 | 3/2009 | Imai | |
| 2010/0073641 A1 | 3/2010 | Han et al. | |
| 2010/0079696 A1 | 4/2010 | Hwu et al. | 349/57 |
| 2010/0128112 A1 | 5/2010 | Marti et al. | 348/51 |
| 2010/0259566 A1* | 10/2010 | Watanabe | 345/690 |
| 2011/0109535 A1* | 5/2011 | Watanabe et al. | 345/87 |
| 2011/0255301 A1 | 10/2011 | Watanabe | 362/558 |
| 2011/0279487 A1* | 11/2011 | Imamura et al. | 345/690 |

* cited by examiner

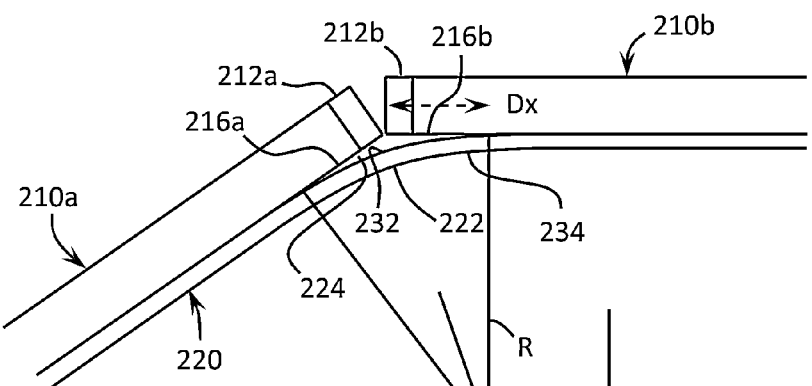
FIG. 5
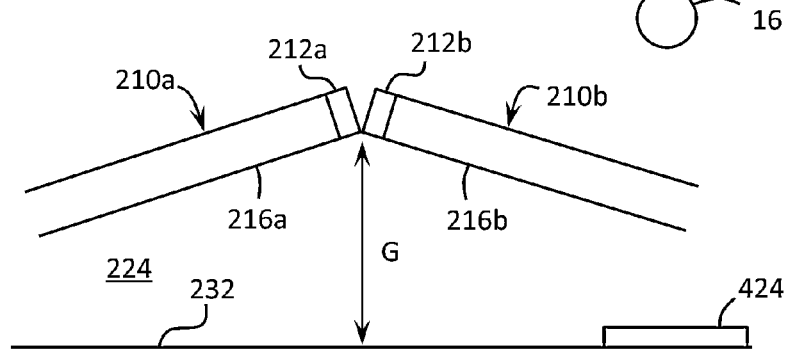
FIG. 6
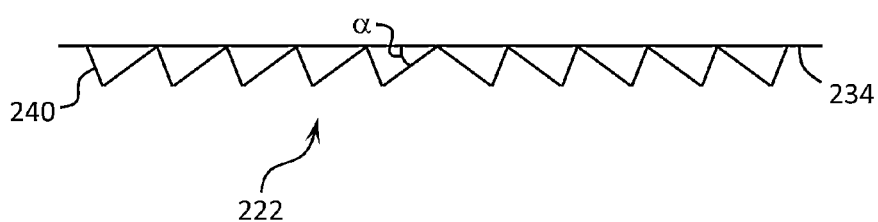

IMMERSIVE DISPLAY WITH MINIMIZED IMAGE ARTIFACTS

CROSS-REFERENCE TO RELATED APPLICATIONS

This application claims the benefit of priority under 35 U.S.C. §119(e) of U.S. Provisional Application Ser. No. 61/721,785 filed on Nov. 2, 2012 and U.S. Provisional Application Ser. No. 61/783,495 filed on Mar. 14, 2013, the contents of which are incorporated herein by reference in their entirety.

BACKGROUND

1. Field

The present invention relates generally to display devices, and particularly to immersive display devices comprising a plurality of adjacent flat panel displays and an arcuate cover sheet positioned proximate the flat panel display.

2. Technical Background

As digital imaging technology rapidly advances, viewers of images on digital displays demand higher and higher image quality and a contemporaneous increase in the level of virtual reality that they experience through the display. Indeed, viewers wish to attain the feeling that they are actually in a virtual 3D space at least in part through the way the images they are seeing are displayed.

One approach to attaining improved virtual (visual) reality was to present a digital image on a digital display with a wider aspect ratio, such as a 16:9 aspect ratio, as compared with a conventional CRT display aspect ratio of 4:3. Although the 16:9 aspect ratio has been used in presenting feature films in theaters and has been well received when applied in home-use digital displays, viewers continue to demand even better virtual (visual) reality.

To continue to improve virtual reality experiences, another approach to advance the technology has been to place a plurality of displays in an array (sometimes referred to as "tiling" the displays) to increase the apparent size of the aggregate screen. As illustrated in FIG. 1, one such configuration is to place three conventional flat panel displays 10 side-by-side (for example, each with a 16:9 aspect ratio) in a linear array to increase the effective aspect ratio (e.g., to 48:9 or other aspect ratios). The goal of such an approach is to provide the viewer with such a wide screen that portions of the image picked up by his or her peripheral vision adds to the effect that the viewer is actually in the virtual space. While this approach yields some improvement in the virtual reality experienced by the viewer, there is one rather glaring disadvantage; namely, that the adjacent peripheral edges of the displays that comprise the bezel 12 introduce discontinuities into the aggregate screen, interrupt the visual flow, and reduce the viewer's virtual experience. Although users may cope with the discontinuities by focusing on the image content to the best of their ability, the visible bezels 12 nevertheless remain a significant and undesirable part of the experience.

Another conventional approach to improving virtual reality experiences is to employ a large, curved screen and project the image onto the screen with a projector. While bezel discontinuities may be reduced and/or eliminated in projection systems, such systems require a rather significant amount of space to locate the screen and projection equipment, which is highly undesirable for many applications, such as home entertainment environments.

SUMMARY

With reference to FIG. 2, one approach to reducing discontinuities introduced into the aggregate screen by display bezels is to provide a system 100 having a sheet of transparent material 14 between the linear array of flat panel displays 10 and the viewer 16. Through the application of light deflecting elements (not shown) on one or the other of the major surfaces of the sheet of transparent material 14 near the bezels 12, coupled with ensuring some distance between such elements and the flat panel displays 10, the bezel-induced discontinuities may be reduced. The success of such an approach, however, is highly dependent on the geometries of the system 100, particularly the position and viewing angle of the viewer 16. Indeed, the geometries of the system 100 may result in a significant reduction in the discontinuities at or near location A of the aggregate screen because the viewer 16 is positioned such that his viewing angle is normal to the screen at such a location. At locations B and/or C, however, the viewing angle may be larger than some threshold with reference to normal (such as about 20 degrees off of normal), which may introduce significant and undesirable artifacts into the image seen by the viewer 16 even as some reduction in the bezel-induced discontinuities may be achieved. This problem is exacerbated as the viewer 16 moves closer to the aggregate screen, which is the likely migration because the viewer 16 will seek to increase the width of the screen to increase his or her "immersion" into the virtual environment. Therefore, no matter where the viewer 16 positions himself with respect to the system 100, there will always be one or more viewing angles that result in undesirable artifacts.

In accordance with one or more embodiments, methods and apparatus described herein provide for: a first flat panel display having a peripheral edge and a first viewing plane; a second flat panel display having a peripheral edge (e.g. bezel) and a second viewing plane, where the first and second flat panel displays: (i) are arranged adjacent to one another along the respective peripheral edges thereof, and (ii) form an obtuse angle T between the respective first and second viewing planes; a cover sheet located in proximity to, and covering the first and second viewing planes, and including a light compensation portion that: (i) is located proximate to the peripheral edges of the first and second flat panel displays, and (ii) has a curvature complementary to the obtuse angle between the respective first and second viewing planes, where the light compensation portion operates to bend at least some light produced by respective peripheral areas of the first and second flat panel displays proximate to the respective peripheral edges thereof to reduce visual discontinuities introduced by such peripheral edges into an image displayed on the first and second flat panel displays.

At least one of the first and second displays may include a privacy film. For example, a privacy film may be disposed on at least a portion of the cover sheet.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description present embodiments that are intended to provide an overview or framework for understanding the nature and character of the disclosure. The accompanying drawings are included to provide a further understanding of the disclosure, and are incorporated into and constitute a part of this specification. The drawings illustrate various embodiments of the present disclosure, and together with the description serve to explain the principles and operations of the disclosure.

BRIEF DESCRIPTION OF THE DRAWINGS

FIG. 5 is a top view of an enlarged portion of the system of FIG. 3A illustrating additional details of light compensation elements;

FIG. 6 is an enlarged view of some alternative and/or additional structures, such as prisms, in and around the light compensation portion of FIG. 5;

DETAILED DESCRIPTION

Figure 1:
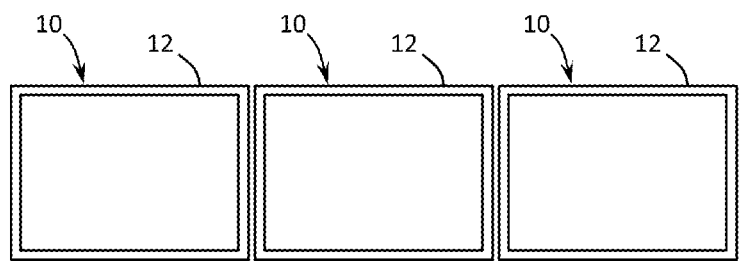
FIG. 1 is a front view of a system of the prior art providing an enhanced viewing experience for a viewer by tiling flat panel displays in an array to produces a relatively large composite viewing plane.
Figure 2:
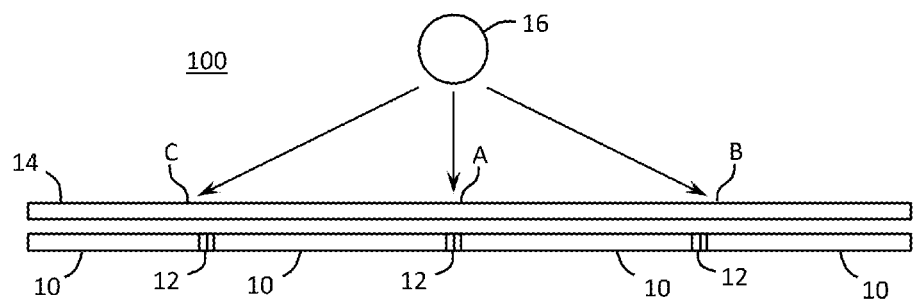
FIG. 2 is a top view (looking down) on a system providing an enhanced viewing experience for a viewer by tiling flat panel displays in an array and providing light compensation to correct for discontinuities introduced by respective bezels of the flat panel displays.

Reference will now be made in detail to the present preferred embodiments of the invention, examples of which are illustrated in the accompanying drawings. Whenever possible, the same reference numerals will be used throughout the drawings to refer to the same or like parts.

Figure 3A:
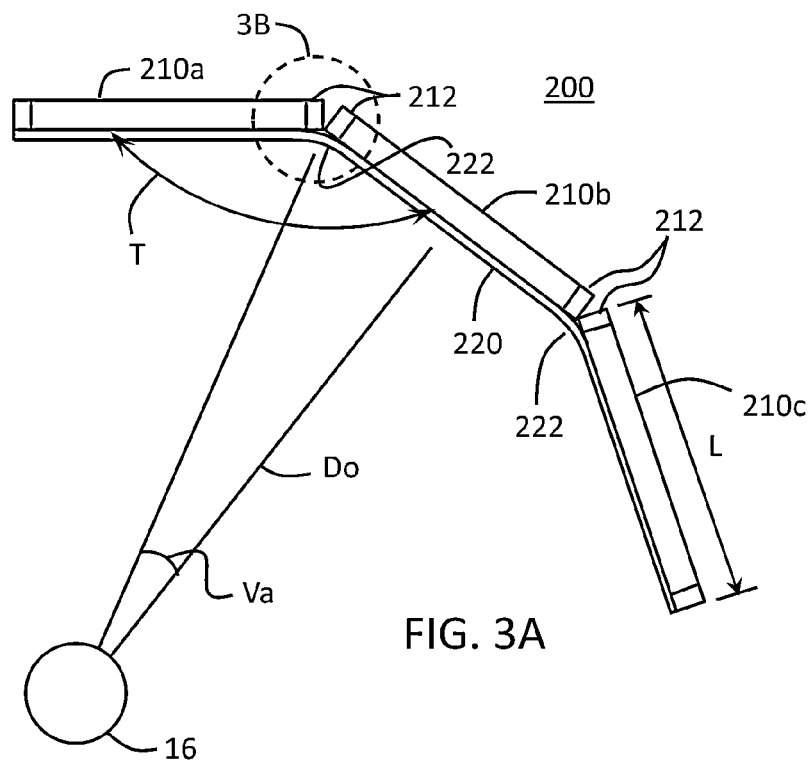
FIG. 3A is a top view (looking down) on an alternative system providing an enhanced viewing experience for a viewer by tiling flat panel displays in an array approximating a curve and providing light compensation to correct for bezel-induced discontinuities.
Figure 3B:
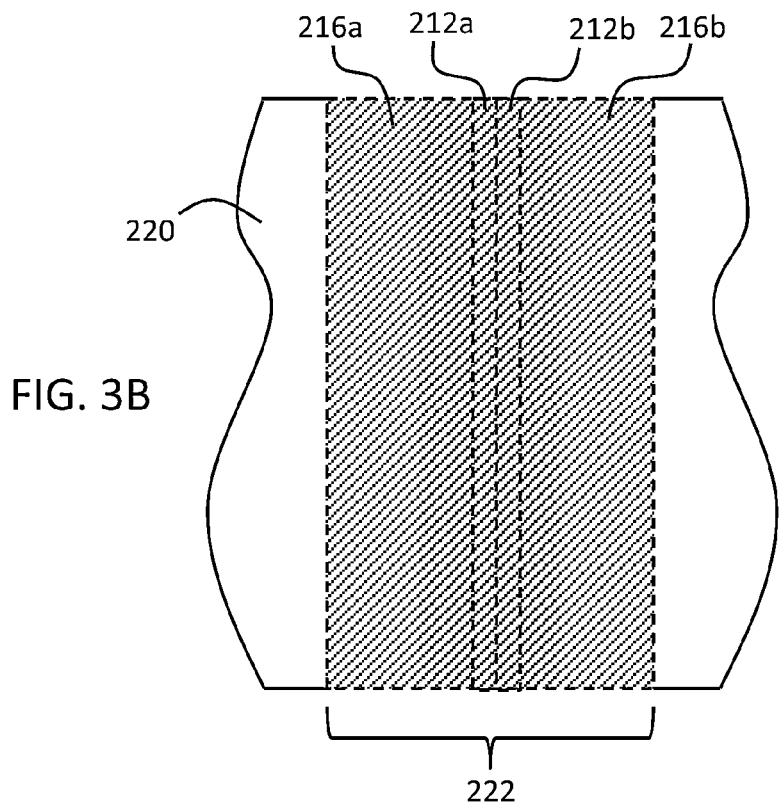
FIG. 3B is a side, elevational view of a portion of the system of FIG. 3A.

With reference to the drawings there is shown in FIG. 3A a top view (looking down on) of a display system 200 providing an enhanced viewing experience for a viewer by tiling flat panel displays in a generally curved array and providing light compensation to correct for bezel-induced discontinuities. FIG. 3B is a side, elevational view of a portion (labeled 3B) of the system of FIG. 3A.

The display system 200 includes a plurality of flat panel displays 210 (e.g. 210a, 210b and 210c) arranged in a generally curved array, and a cover sheet 220 located in proximity to, and covering the flat panel displays 210. As will be discussed in more detail below, the cover sheet 220 includes a light compensation portion 222 that reduces the visual discontinuities introduced by peripheral edges 212 (e.g. bezels 212a-c) of the flat panel displays 210. It should be noted that such discontinuities may also be caused by gaps between adjacent bezels. The present embodiment illustrates a so-called one-dimensional, semi-cylindrical array because there is but one row and several columns of the flat panel displays 210. Skilled artisans will appreciate, however, that the detailed description herein may be readily applied to two-dimensional arrays of displays without departing from contemplated embodiments. Two-dimensional arrays may be semi-spherical (exhibit two-dimensional curvature) or cylindrical (exhibit one-dimensional curvature) or comprises an arcuate shape that is not semi-spherical or cylindrical.

Among the significant differences between the display system 200 and other systems discussed in this disclosure are that the flat panel displays 210 are arranged in a piecewise array approximating a curve, and that the cover sheet 220 is also curved, at least in the regions where the peripheral edges 212 are located. An advantage of this approach is that a well-placed viewer (observer) 16 will enjoy a more robust reduction in the bezel and/or gap-induced discontinuities owing at least in part to the fact that the respective curvatures contribute to maintaining some degree of perpendicularity between the image plane and the various points of view of the viewer. Capitalizing on such advantage does, however, require some degree of precision in the location of the viewer 16 relative to the structure (preferably at or near to a local center of curvature of the cover sheet 220), which will be discussed in more detail below.

Turning now to a more detailed description of the embodiment illustrated in FIGS. 3A-3B, the display system 200 includes first, second, and third flat panel displays 210a, 210b, 210c, each having peripheral edges and a respective viewing plane, i.e., the surface of the flat panel display generally facing the viewer 16. Respective pairs of the flat panel displays 210a-c are arranged such that respective peripheral edges thereof, e.g. bezels 212a, 212b and 212c, are arranged adjacent to one another and form respective obtuse angles T between the respective viewing planes. Thus, for example, the first and second flat panel displays 210a, 210b are positioned such that respective edges thereof are in close proximity, or possibly touching, and form an obtuse angle T, for example, in a range from about 100 to about 200 degrees, in a range from about 120 to about 160 degrees, in a range from about 120 degrees to about 140 degrees, or any desirable number of degrees in a range from between about 100 degrees and about 160 degrees. The second and third flat panel displays 210b, 210c may be similarly positioned with respect to one another. The angular arrangement of the flat panel displays depends in part on the total angular extent of the immersive display device relative to the viewer and the number of flat panel displays used. That is, the minimum number of flat panel displays is two, whereas the maximum angular extent would be 360 degrees (wherein the display device completely encircles the viewer), requiring more than two individual displays.

The cover sheet 220 is located in proximity to, and covering at least the viewing planes of the flat panel displays 210a-c relative to the viewer 16. Cover sheet 220 may be a single piece of material, or comprise two or more pieces of material arranged adjacent each other in an edge-to-edge fashion. The cover sheet may be, for example, a continuous piece of material so as not to introduce any seams or other visually disruptive features into the display system 200. For example, the cover sheet 220 may be formed from a continuous piece of transparent material, such as glass, plastic, etc., which has been shaped to complement the general curvature established by the flat panel displays 210a-c. In some embodiments, the cover sheet 220 may be formed from a single layer of material, while other embodiments may employ a laminated structure (such as multiple layers of glass and/or plastic) or otherwise layered structures, some of which will be discussed later in this description.

The cover sheet 220 includes at least one light compensation portion 222 in proximity to each of the bezels 212a-c, for example, in the area labeled 3B in FIG. 3A. One such light compensation portion 222 is illustrated by the hashed lines of FIG. 3B. In this particular example, the light compensation portion 222 is located proximate to the respective peripheral edges 212a, 212b of the first and second flat panel displays 210a, 210b, respectively. The light compensation portion 222 is positioned at the curved portion of the cover sheet 220, which is located along a line representing a vertex of the obtuse angle T (when viewed from an end) formed between flat panel displays 210a, 210b. In that sense, the light compensation portion 222 may itself be considered to have a curvature complementary to the obtuse angle T between the respective first and second viewing planes of the flat panel displays 210a, 210b.

With reference to FIG. 3B, the light compensation portion 222 bends light produced by respective peripheral areas 216a, 216b of the first and second flat panel displays 210a, 210b. The peripheral areas 216a, 216b are generally considered to be the areas at or near the respective peripheral edges 212a, 212b of the flat panel displays 210a, 210b. The bending of the light originating from the peripheral areas 216a, 216b is accomplished in such a way as to reduce visual discontinuities introduced by the peripheral edges 212a, 212b (e.g., bezels 212a, 212b) into the portion of the image displayed on the first and second flat panel displays 210a, 210b. That is, the bending of the light results in an image displayed by one or more of the flat panel displays being imposed on the cover sheet 220 in a position that obscures the bezel and/or any gaps between the adjacent flat panel displays relative to the viewer. As a result, the viewer sees an uninterrupted image.

Figure 4:
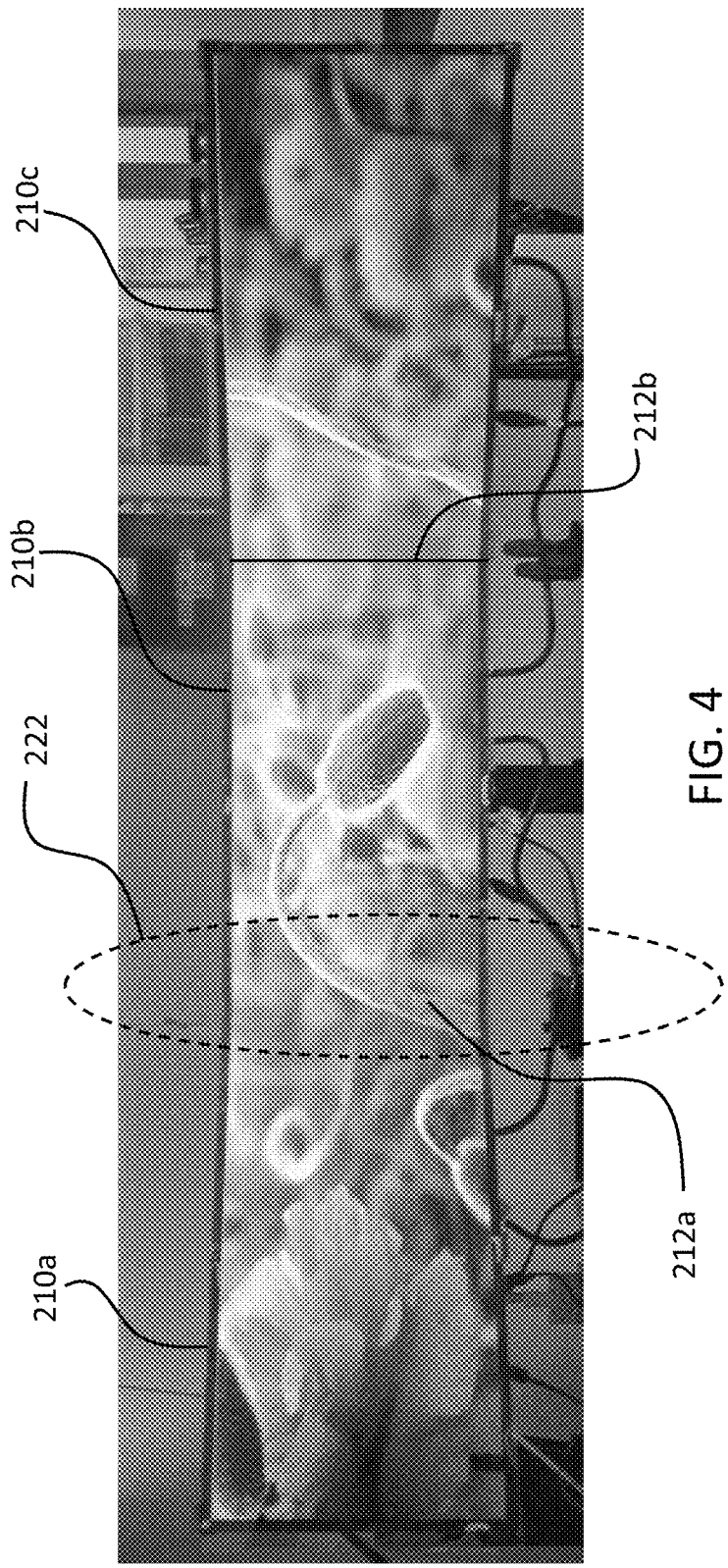
FIG. 4 is an elevational digital image of a prototype built in a laboratory environment implementing the system of FIG. 3A and employing light compensation techniques in accordance with one or more embodiments described herein.

FIG. 4 is a digitized image of an actual display system 200 built to the general specifications shown in FIGS. 3A-3B. As is clearly shown, the light compensation portion 222 shown on the left of the image reduces the visual discontinuities introduced by the bezels 212a,b between displays 210a, 210b. In fact, there are no readily discernible discontinuities visible in the image. In contrast, there is no operational light compensation portion 222 to eliminate the discontinuities introduced by the bezel 212b,c between the second and third flat panel displays 210b, 210c shown on the right of the image.

Reference is now made to FIG. 5, which is a top view of an enlarged portion of the system of FIG. 3A, and which illustrates additional details of the light compensation portion 222. The curvature of the light compensation portion 222 of cover sheet 220 and the proximity thereof to the peripheral edges 212a, 212b of the first and second flat panel displays 210a, 210b produces a gap 224 between a back side 232 of the cover sheet 220 (the side of the cover sheet facing the flat panel displays) and the respective peripheral areas 216a, 216b and the peripheral edges 212a, 212b of the first and second flat panel displays 210a, 210b. As the viewer moves away from the peripheral areas 216a, 216b and the peripheral edges 212a, 212b of the first and second flat panel displays 210a, 210b. That is, moves out towards more central areas of the displays, the dimensions of the gap 224 gradually reduce until there is little or no gap between the back side 232 of the cover sheet 220 and the first and second flat panel displays 210a, 210b. The significance of the specific contours of the gap 224 will be discussed in greater detail below. Suffice it to say, however, that the dimensions of the gap 224 can play an important role in compensating for the discontinuities introduced by the bezels 212a-c.

Reference is now made to FIG. 6, which is another enlarged view of the structures in and around the light compensation portion 222 of the cover sheet 220. In this embodiment, the light compensation portion 222 includes a plurality of prisms 240 disposed on at least one of the back side 232 or the opposite front side 234 of the cover sheet 220. Each prism 240 includes at least one respective apex angle α, which is the smallest acute angle adjacent the cover sheet 220 of a prism 240. In this embodiment, it is assumed the respective apex angle of each prism 240 is substantially the same, at least within a prescribed range of permissible apex angles. The dimensions of the gap 224 and the geometries of the prisms 240 cooperate to bend at least some light produced by respective peripheral areas 216a, 216b in such a way as to reduce the visual discontinuities introduced by the bezels 212a, 212b into the portion of the image displayed on the first and second flat panel displays 210a, 210b.

Figure 7A:
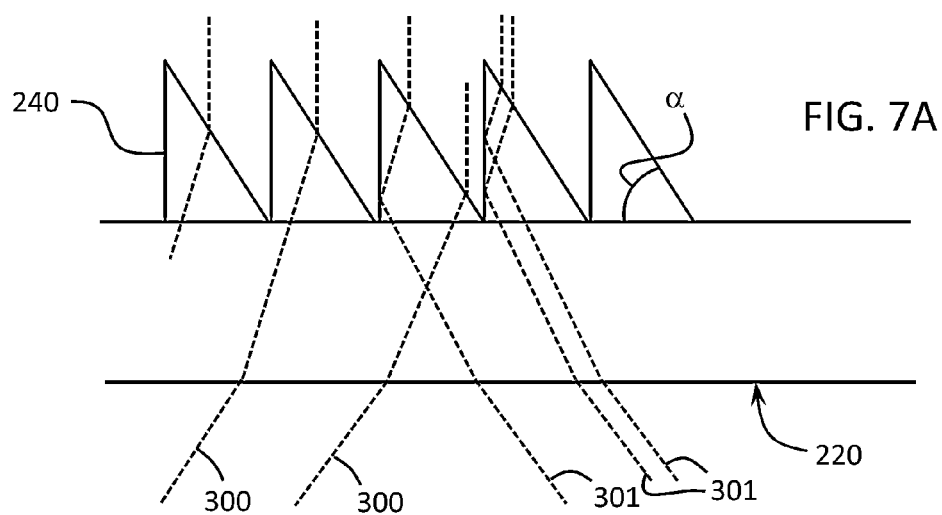
FIG. 7A is schematic diagram illustrating some non-ideal characteristics of the prisms of FIG. 6.

One of the problems associated with the use of prisms for deviating light is shown by FIG. 7A. As can be seen, a portion of the rays represented by reference numeral 300 are purely transmitted by the prisms 240, which is the desired effect. However, a portion of the rays represented by reference numeral 301 may experience total internal reflection, which is an undesired effect. As a consequence, a viewer will see rays that are coming from two different positions on the flat panel displays, which will result in ghosting (superposition of two different images or portions thereof). The ghosting can be quantified by a factor k, which is equal to the proportion of undesired rays 301 to the total rays 300 plus 301.

Figure 7B:
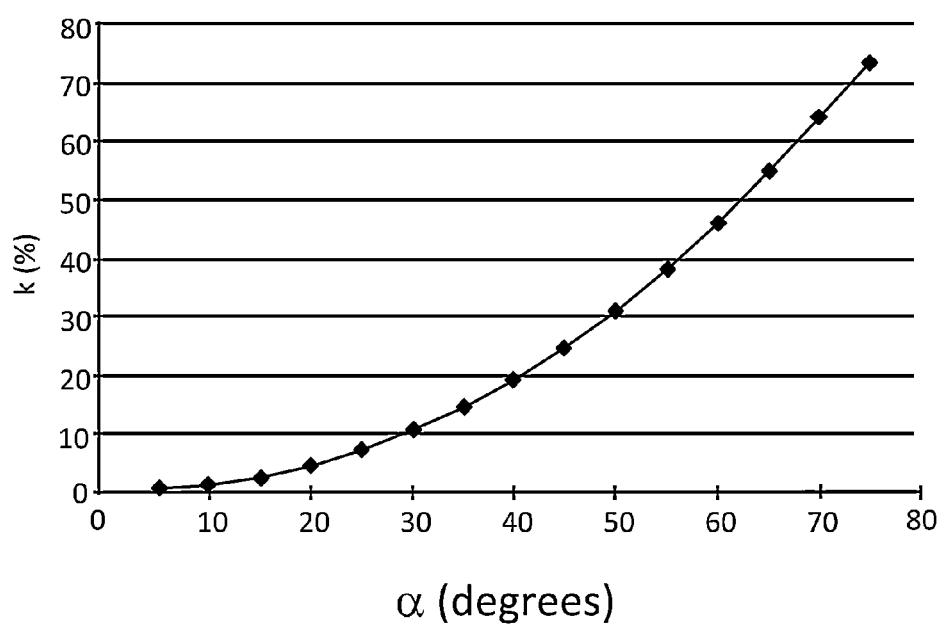
FIG. 7B is a graph illustrating a relationship between an apex angle of the prisms of FIG. 6 and a resultant quantity of light that is propagating in an undesirable direction.

The relationships between the dimensions of the gap 224 and the optical properties of the prisms 240 will be discussed in greater detail with reference to both FIGS. 5 and 6. As an initial matter, however, reference will first be made to FIG. 7B, which is a graph illustrating the relationship between the apex angle α of the prisms 240 (along the x-axis) and a resultant k factor along the y-axis expressed as a percent. In general, FIG. 7B shows that there are competing design considerations involved with the selection of the apex angle α of the prisms 240.

The surface geometries of a prism 240 will direct incident light in two complementary directions about an axis, with one of the directions being a desirable direction for the bending and bezel compensation purposes discussed herein. The light propagating in the other direction due to the prism 240 geometry, however, does not assist in compensating for the bezel discontinuities. Rather, such light introduces other undesirable artifacts, primarily ghosting, which is somewhat dependent on the direction of view. When the prisms 240 have relatively small apex angles, the percentage of light directed in the opposing-complementary (but undesirable) direction is also relatively low. On the other hand, to achieve a desired level of bending of the light through the prism 240 (which is also a function of the dimensions of the gap 224), it is desirable to employ a relatively large apex angle. Indeed, certain dimensions of the gap 224 must increase as the apex angle is reduced to achieve substantially the same amount of light bending. Since it is generally desirable to keep the dimensions of the gap 224 small (to keep the display system 200 thin and streamlined), a relatively large apex angle α for the prisms 240 should be selected.

Balancing these competing characteristics requires careful consideration of certain design tradeoffs. Experimentation has shown that the range of permissible apex angles for each prism 240 should be in a range from about 20 degrees to about 50 degrees provides for satisfactory viewing, for example, in a range from about 30 degrees to about 40 degrees. Indeed, under such limitations, the percentage of light contributing to ghosting may be limited to about 20% or less, which has been found to be visually acceptable. Once the apex angle of the prism 240 is selected, a number of other parameters may be established based upon certain geometric and optical relationships characterizing the display system 200.

As described above, there is a relationship between a desired level of light bending through the prisms 240 and the dimensions of the gap 224. One dimension of interest for gap 224 is a depth dimension G extending along a normal axis from the back side 232 of the cover sheet 220 to the intersection of the first and second flat panel displays 210a, 210b (see FIG. 6). Although the depth dimension G might be defined in any number of ways, it is useful to consider the dimension extending from the back side 232 to a reference axis that is central to, or at an intersection of, the peripheral edges 212a, 212b of the flat panel displays 210. In one or more embodiments, a minimum of the depth dimension G of the gap 224 is proportional to $1/(\TAN(Da-Va))$, where Da is the deviation angle produced by each prism. That is, the angle through which light entering the prism is refracted upon leaving the prism. Va is an angle of view from a point of view of the viewer 16 toward the peripheral edges 212a, 212b of the first and second flat panel displays 210a, 210b (see FIG. 5). Skilled artisans will understand that the deviation angle Da is based on the geometries and optical properties of the prisms 240 (particularly the apex angle). The viewing angle Va is best seen in FIGS. 3A and 5. Since the bezel 212 (e.g. 212a, 212b) includes some width, the depth dimension G of the gap 224 may be expressed in terms of the width of the bezels; namely, G is proportional to $B/(\TAN(Da-Va))$, where B is a width of the bezel measured perpendicular to the respective peripheral edges 214a, 214b.

Another important parameter of the light compensation portion 222 is the radius of curvature, R, of the cover sheet 220 in the area of the bezels 212. The radius of curvature R is proportional to $G*((\COS(90-T/2))^{-1}-1)$, where T is the obtuse angle between the respective first and second viewing planes of the flat panel displays 210. Notably, the radius of curvature R cannot be arbitrarily large as such would not yield satisfactory results. Thus, it has been found that the radius of curvature R should be constrained, for example such that $Dx=R*\TAN(90-T/2) \leq L/2$, where Dx is a linear dimension that is based on the radius of curvature (see FIG. 5), and L is a width of the flat panel display 210. Dx can be viewed, from the perspective of the viewer 16, as the distance between the point of incidence of light on the plane of a display panel for a ray of light originating at the viewer and passing through the display cover and the prisms, and the point of incidence of the same ray of light had there been no prism. Accordingly, Dx is a function of the deviation angle, as it is the deviation angle that results in the offset distance Dx.

Based on the foregoing, one example of a display system 200 employing suitable geometric and optical properties includes the following parameters: obtuse angle T=140 degrees, viewer distance Do=1.37 meters, apex angle=40 degrees, deviation angle Da=20 degrees, angle of vision Va=+/−20 degrees, bezel width B=8 mm, gap depth G=46 mm, radius of curvature R=716 mm, Dx=261 mm, and display width L=1 meter.

While the above embodiments employed prisms 240 having respective apex angles α that were substantially the same, alternative embodiments may employ prisms 240 where the respective apex angle of each prism 240 varies as a function of a distance of such prism 240 from the peripheral edges 212a, 212b of the first and second flat panel displays 210a, 210b. In particular, as one moves laterally away from the position at which the maximum gap depth dimension G is located in either direction, the dimension of the gap 224 gradually reduces. As the dimension of the gap 224 reduces, the light bending effect is likewise reduced; indeed, the light bending is zero when the gap dimension is zero (i.e., at the extreme lateral edges of the gap 224) irrespective of the apex angle(s) of the prisms 240. This phenomenon may be capitalized upon by varying the apex angles of the prisms 240 in such a way as to reduce the apex angle as the gap dimension reduces. Such a reduction in apex angle may be used to reduce the overall area of the cover sheet 220 occupied by prisms 240 (especially in the lateral direction). This characteristic may be expressed another way in that the respective apex angles α of the prisms 240 are: (i) at a maximum when the gap distance G is at a maximum, and (ii) gradually decrease as the gap distance G decreases. As an example, assuming zero is the position on the cover sheet 220 where the gap distance G is maximum, the apex angles can be expressed as:

$$\alpha(x) = \alpha 0 - k \, abs(x), \text{ for } abs(x) \text{ between } 0 \text{ and } \alpha 0/k.$$

Although the preceding formula may minimize the amplitude of image artifacts, such as cross talk, it should be understood that cross talk remains unavoidable and also becomes greater when the viewer 16 is not located at a position for which the system has been optimized. To further minimize the amplitude of ghosting, another option involves using directional displays, i.e. displays that emit light mostly in a specific direction (or range of directions). In other words, the light emitted by at least one of the first and second displays 210 is emitted in a non-perpendicular direction β with respect to the viewing plane thereof.

Figure 8:
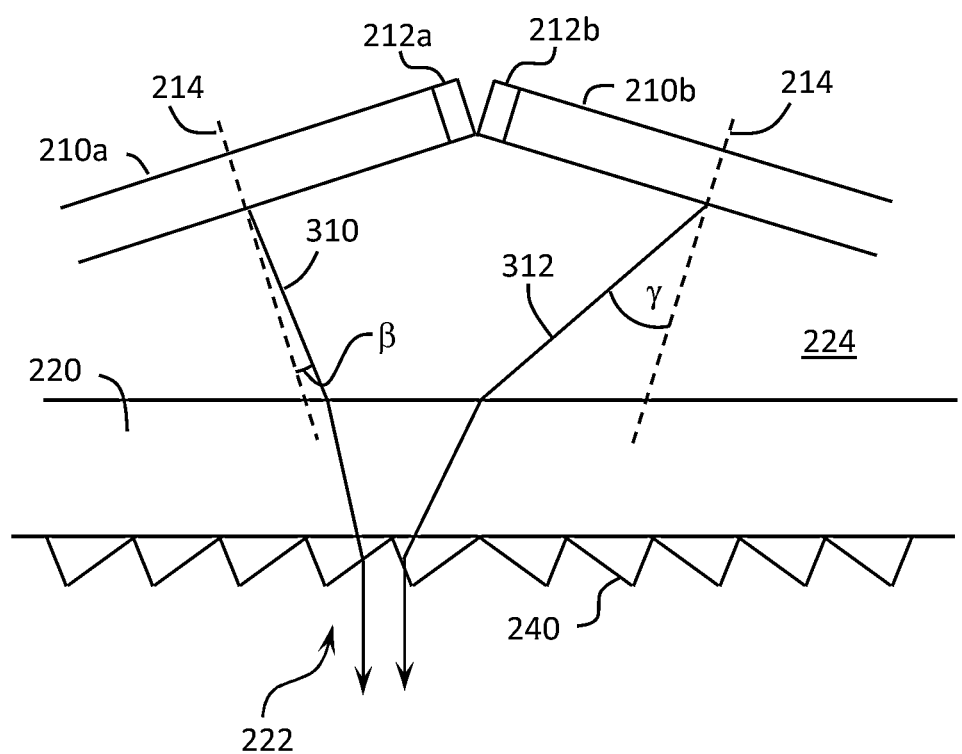
FIG. 8 is an enlarged view of some alternative and/or additional structures and characteristics in accordance with one or more further embodiments.

FIG. 8 illustrates additional and/or alternative features in connection with an effect in which the viewer 16 will view at least two types of rays. Rays 310 contain the desired image and form the angle β with respect to the viewing planes of the flat panel displays 210a, 210b, etc. Rays 312 generate undesirable ghost images and form another angle γ with respect to, for example, the flat panel display 210b. By designing the displays 210a, 210b, etc. such that light is mostly emitted around the angle β, the amount of light (i.e. "ghost rays") emitted at angle γ can be minimized, resulting in further reductions in the ghosting amplitude. Indeed, the ghosting is basically replaced by a local dimming of the image, which may be less disturbing to the viewer 16. Also, local dimming can be compensated by, for instance, designing the backlight of the flat panel displays 210 (such as LCD displays) in such a way that the image is brighter at locations where the prisms 240 are introducing more dimming. Also, the image can be processed by increasing locally the image brightness. Modeling has shown that the angle β should be constrained to about ±45 degrees relative to surface normals 214 of the flat panel displays to avoid ghosting, although in some instances β within ±60 degrees may be acceptable.

Such directional displays can be of two types. One type uses a directional backlight, which creates very bright images. The other type involves adding a privacy filter such as 3M™ PF24.0W film, which transmits light only at normal incidence. These latter types are not preferred since they tend to make the entire image darker. In general, the latter type of flat panel display emits light at an angle on the order of 30 degrees, and is optimized to emit light perpendicular to the display plane. This may not be optimum, since the desired angle β may not be perpendicular and may also depend on the position across the display. One may then need to add a prism film on top of the display (with no air gap) to bend the light from normal incidence to the desired angle β.

Figure 9:
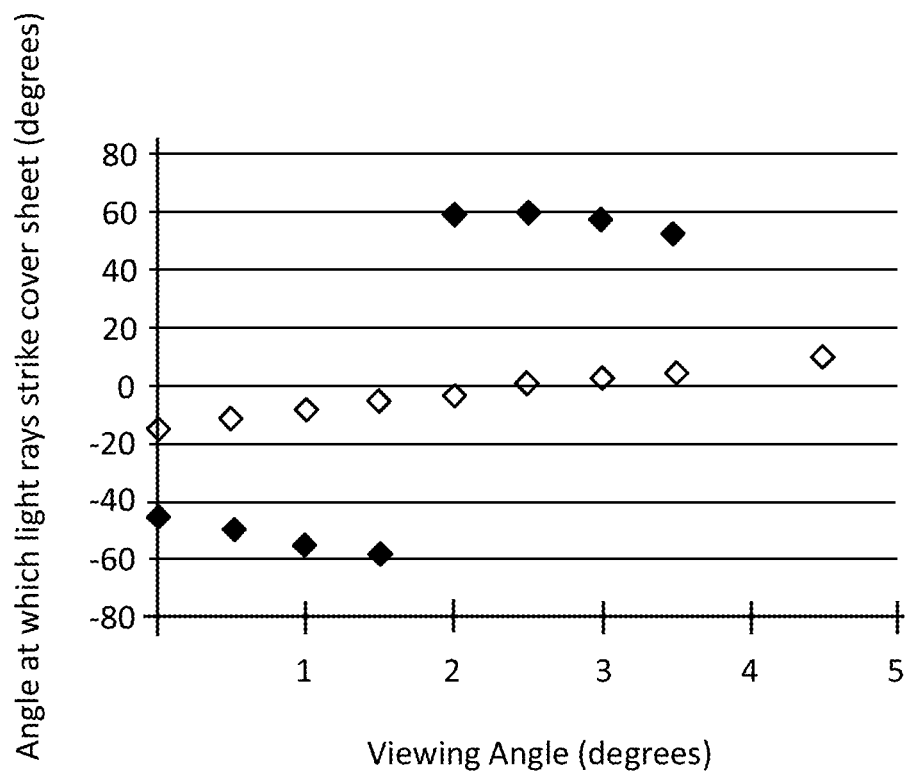
FIG. 9 is a graph of the angle of "regular" and "ghost" light rays relative to respective normals to the viewing planes of the flat panel displays as a function of viewing angle.
Figure 10:
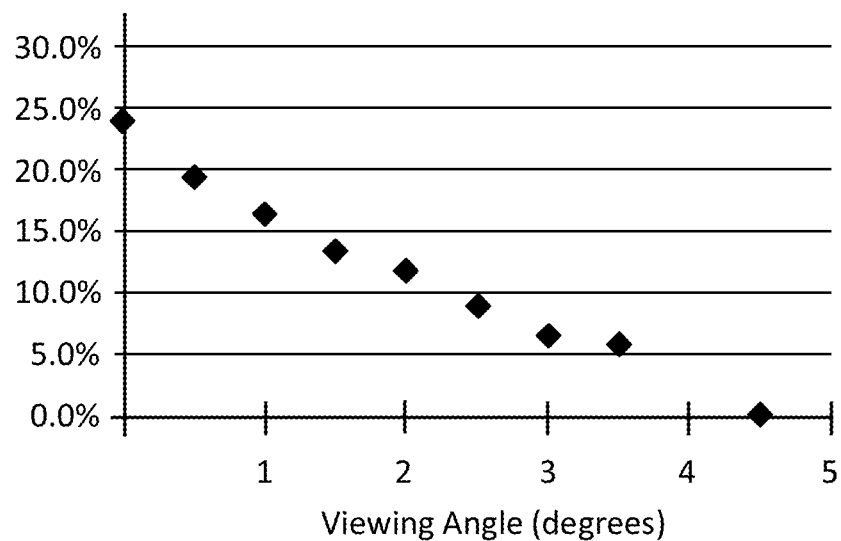
FIG. 10 is a graph of the percentage of light contained within the "ghost" rays of FIG. 9 as a function of viewing angle.

As is shown in FIGS. 9 and 10, ghost images occur at very small viewing angles (with regard to the cover glass). For example, all angles β of "regular rays" (represented by unfilled diamonds) at the display side are within ±15 degrees (see FIG. 8), while for the rays producing ghost images, all angles γ (represented by filled diamonds) are larger than ±45 degrees of normal. The amount of light that goes into the ghost images drops as the viewing angle Va increases. Accordingly, for directional backlighting, if the backlight is configured such that emission angles lie outside of the range for the ghost rays, the viewer is unlikely to see ghost images. For example, if the backlight emits at an emission angle within ±45 degrees of normal, ghost images will not be visible to a viewer. This backlight emission angle must be large enough to accommodate the range of angles for the "regular rays", as well as the designed viewing angle for the immersive display.

For locations on the display panel that do not need image magnification, the backlight can remain the same to accommodate a large viewing angle. Thus, the whole display would be immersive and free of ghost images for a designed viewing angle (e.g. ±20 degrees of normal for the current design), and be non-immersive (with gaps showing between displays) and ghost image free for a much larger viewing angle (e.g. ±90 degrees of normal). Or, if the backlight comprises a narrow emission angle everywhere, the whole display system would work quite well for a single viewer sitting close to the center of curvature of the display. The display would be immersive and ghost image free for a smaller viewing angle, and would be dark for angles outside of the range.

To obtain a tiled display with uniform brightness, additional modifications to the brightness profiles of the individual backlights may be needed. If each display is maintained at uniform brightness across all locations on the display, when a backlight having a narrow emission angle is used and no more ghost images can be formed, the amount of light that originally would contribute as ghost images (see FIG. 10) is no longer there, and therefore brightness would drop between displays. Brightness between displays may also drop due to scattering by the prisms due to imperfections in the prism fabrication process. To correct for a brightness dip between displays, the backlight brightness profile vs. location can be optimized.

Commercially available 3M Vikuiti™ brightness enhancement films (BEF) are right-angle prismatic array films used to increase the brightness of backlights on-axis. For both one-dimensional and two-dimensional tiling of immersive displays, these films can be positioned on a conventional backlight between the backlight and the display panel to produce a directional backlight having a narrow emission angle and reduce the optical power going into ghost images.

Figure 11:
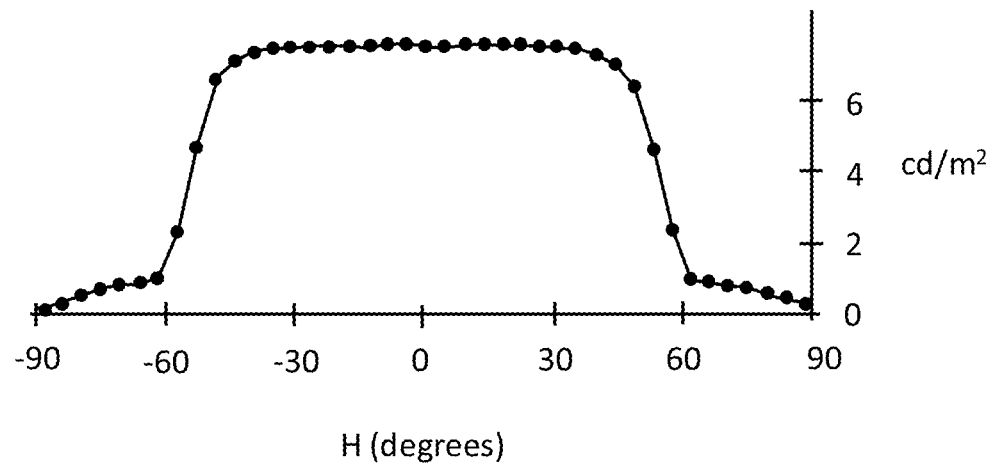
FIGS. 11 and 12 are orthogonal graphical views of the angular light distribution from a directional backlight comprising a brightness enhancing film (BEF)
Figure 12:
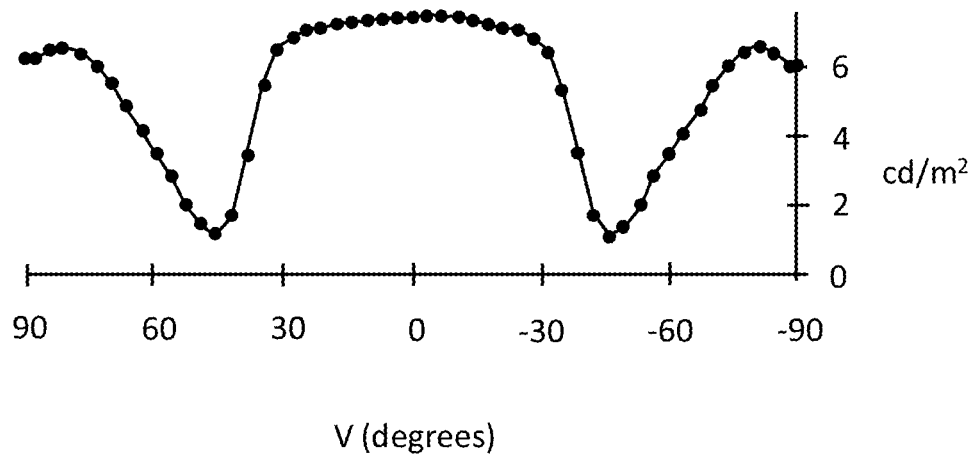

The BEF film changes the angular distribution of light in an asymmetric manner. The angular light distribution for one commercially available BEF film positioned over a Lambertian emission backlight is shown in FIGS. 11 and 12, where luminosity is plotted in units of candela per meter squared ($cd/m^2$) as a function of emission angle. If one BEF film is used with the V dimension aligned with the dimension in which the emission angle is to be reduced, at least partial suppression of ghost imaging can be expected (60% to 85%, depending on the viewing angle). If the ghost ray angles (i.e. angles γ) are outside of an angular range of ±60 degrees, then for one-dimensional tiling the H dimension of the BEF film can reduce ghost images by approximately 90%.

Figure 13:
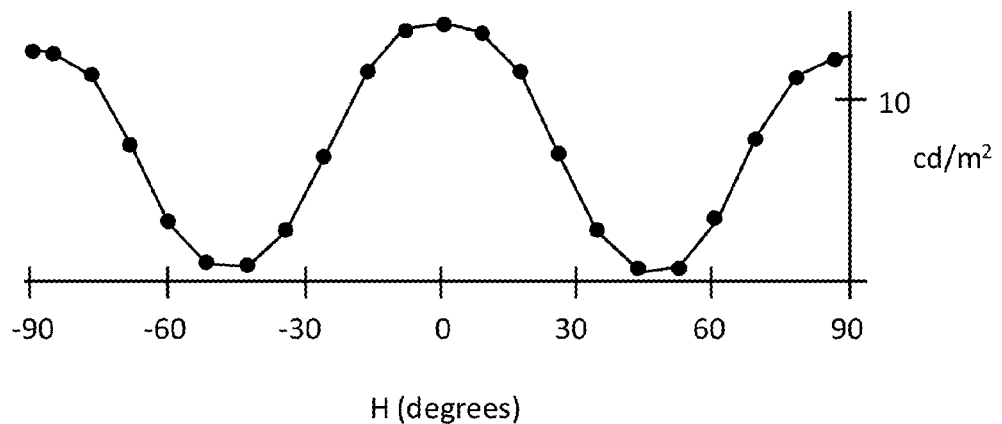
FIGS. 13 and 14 are orthogonal graphical views of the angular light distribution from a directional backlight comprising two crossed brightness enhancing films.
Figure 14:
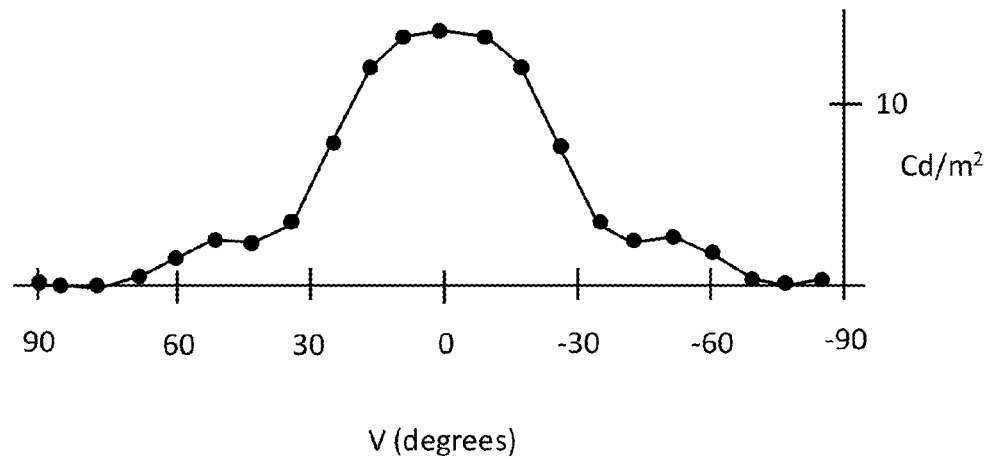

In some embodiments two crossed BEF films may be used to further narrow emission angles (FIGS. 13 and 14). This approach can potentially be used for both one-dimensional and two-dimensional display tiling. If the V dimension is used along the dimension of interest, for the current design, suppression of ghost imaging in a range from about 85% to about 90% would be expected. If the H dimension is used, a suppression of ghost imaging in a range from about 77% to 92% would be expected.

To improve light transmission efficiency, a reflector, either diffuse or specular, can be placed at the bottom of the backlight for light recycling.

As previously described, there may be a need to adjust brightness locally to avoid having a brightness drop close to a bezel. Conventional backlights usually employ a waveguide illuminated from the edges by LED's or cold cathode fluorescent light sources. Light extraction is performed by painting white diffusing dots on the back of the backlight. The local brightness is a function of the size and density of those dots. In conventional backlights, the dot density and size is optimized to provide uniform intensity lighting across the image. This usually leads to designs where the dot density is larger proximate the center of the display panel since the power density of the light propagating inside the waveguide decreases as a function of distance from the edge-positioned light sources. The power drop close to the edge of the panel caused by the Fresnel structure can easily be compensated by increasing the density of dots on the backlight proximate the edges of the display panel.

Figure 15:
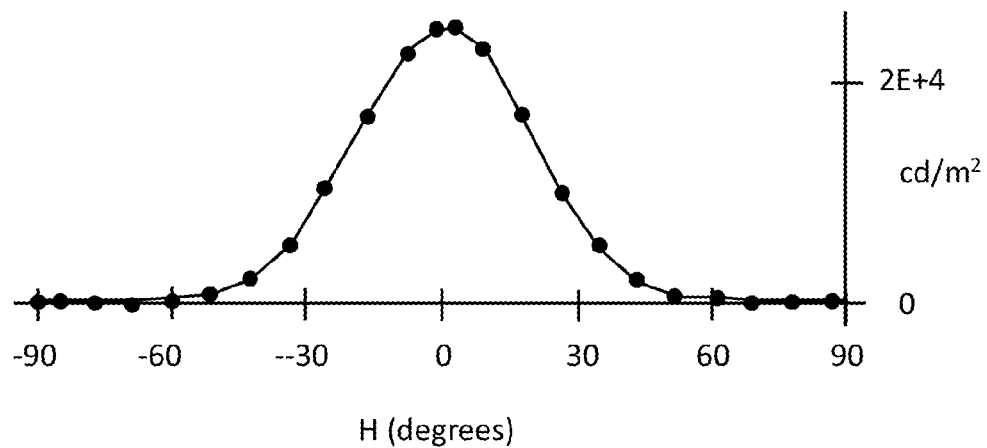
FIGS. 15 and 16 are orthogonal graphical views of the angular light distribution from a commercially available narrow emission angle LED.
Figure 16:
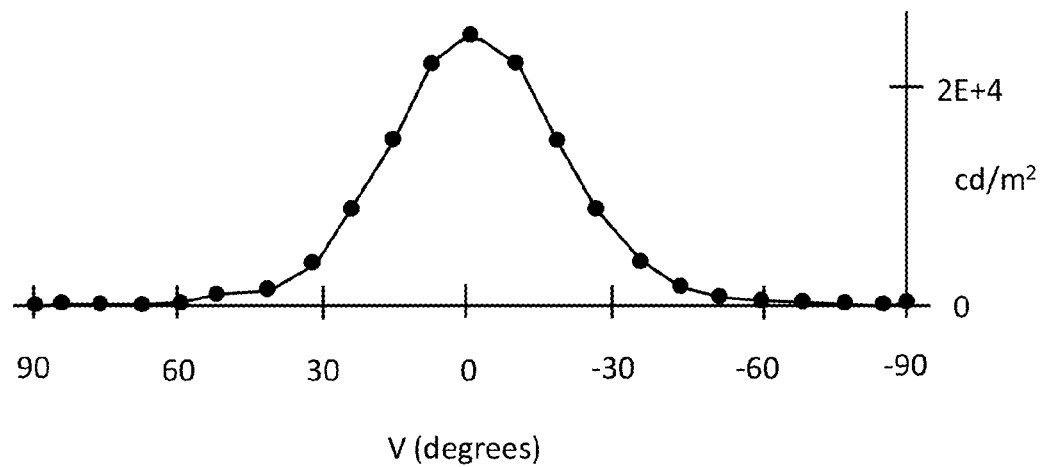

Alternatively, the backlight may be constructed using narrow emission angle light sources. For example, the angular light distribution for a commercially available collimated LED can be as low as about ±80 degrees from the peak intensity, as shown by FIGS. 15 and 16. This example LED would almost completely eliminate ghost images. A different source can be chosen for different designs and for the desired level of ghost image suppression. Accordingly, LEDs with smaller or larger emission cones can be selected based on the individual design of the display device.

For two dimensional tiling of immersive displays, a large number of LEDs would be needed in a two dimensional array. For one dimensional array tiling, the number of LEDs can be significantly reduced by using one-dimensional diffusers. LEDs can then be aligned into a row along the dimension that needs ghost image suppression. On the other dimension a 1 dimensional diffuser (such as a holographic diffuser) can be used to achieve uniform brightness using sparsely spaced rows of LEDs.

A disadvantage for this approach is that because diffusers cannot be used on the dimension of interest (since it would broaden the angular emission profile), a distance is required for the light to travel between the light sources and the other side of the backlight, for the intensity profile to be uniform. For the example LED above, when LEDs are placed side by side in a row (with spacing of 12 mm), a travel distance of 20 mm is needed before the summed intensity from neighboring LEDs reaches uniformity. This distance can be reduced by reducing the spacing between LEDs, choosing an LED with a larger angular emission range (with trade-off of less ghost image-suppression), and adding LEDs in between the existing LEDs on a neighboring row.

An similar approach to this is to use a combination of normal angular distribution LEDs and a lenslet array to obtain a similar output backlight angular distribution as the above.

Another geometry to consider is using an edge-lit configuration. For an edge-lit light guide with either a wedge or prismatic structures on the bottom, very narrow emission angle ranges can be achieved in one dimension, and the emission angle can be tuned by changing the wedge angle/prism angle.

Figure 17:
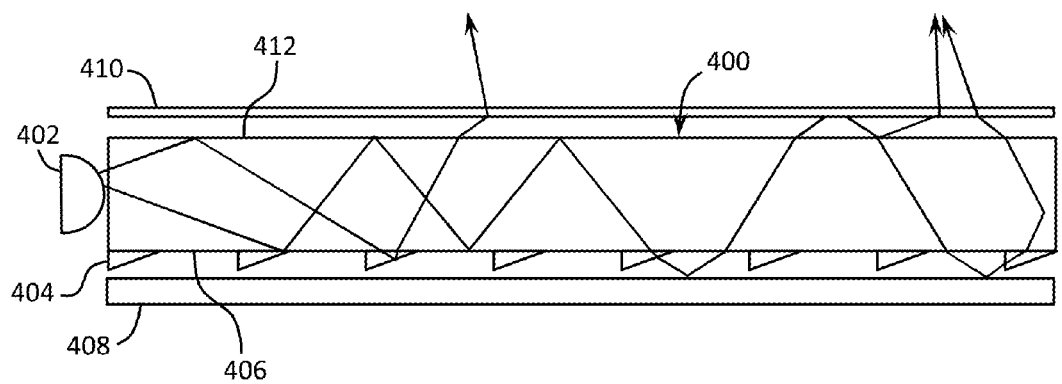
FIG. 17 is a cross sectional view of a directional backlight comprising a turning film.

The guide with prism features on the bottom achieves a narrow emission angle through failed total internal reflection (TIR). For example, FIG. 17 illustrates a directional backlight comprising a light guide 400, a light source 402 (e.g. LED) illuminating the light guide from an edge thereof, prisms 404 positioned on a back side 406 of the light guide relative to a position of a viewer of a flat panel display illuminated by the backlight, a reflective member 408 positioned proximate the backside and a turning film 410 positioned at a front surface 412 of the light guide. If no prisms/wedge is present on the bottom of the guide, any ray that starting a TIR propagation in the guide would keep propagating through TIR until the end. However, when prisms are present, every time a ray hits a prism, its direction of propagation is changed, and its angle of incidence at the air-glass interface is reduced. Once the angle of incidence at the interface is larger than the TIR angle, the ray would leak out of the guide at a large angle. Then a turning film is used to turn the ray towards the viewer. The prism angle α (angle of the shallow side of the prism with regard to the light guide) determines the range of angles for the rays leaked out of the light guide. The smaller the prism angle is, the more gradual the ray's angle of incidence reduces within the light guide, and therefore the smaller the angular range is for the leaked rays. To improve efficiency, a specular light reflector is added underneath the light guide for light recycling. The turning film is also customized with a top angle of 63 degrees.

Figure 18:
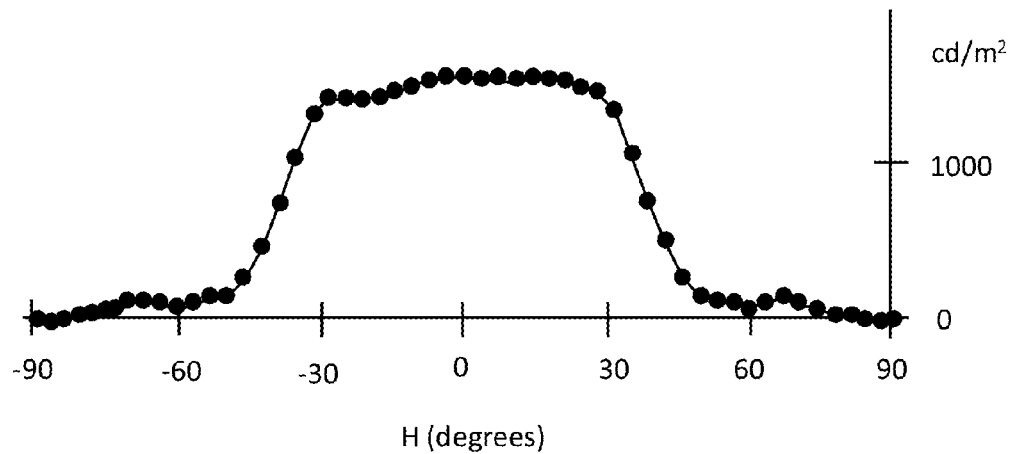
FIGS. 18 and 19 are orthogonal graphical views of the modeled angular light distribution from the directional backlight of FIG. 17.
Figure 19:
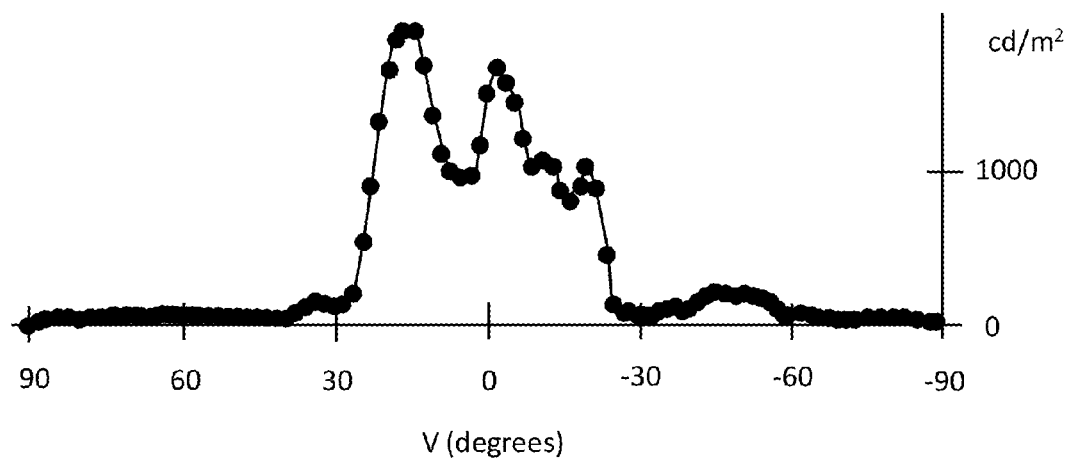

Modeling results are shown in FIGS. 18 and 19 for an exemplary narrow emission angle light guide as shown in FIG. 17. A light having an emission angle of ±80 degrees was used for an edge-lit source. The prism angle α on the shallow side was 15 degrees. Prismatic structures narrow the light emission angles along the V dimension, such that very little power is present outside of ±30 degrees. Along the orthogonal H dimension, very little power is present outside of ±45 degrees, which is mostly due to the refraction of the source at the input air-glass interface.

The example model would minimize ghost images along both dimensions, and therefore can be used for both one-dimensional and two-dimensional tiling. An advantage of this approach is its adaptability for different designs. For example, if a smaller angular range backlight is required, the prism angles can be reduced to provide smaller angle of vision along one dimension.

To adjust the brightness profile of individual backlights to achieve uniformity for the whole tiled display, two methods can be used. First, the spacing of the prisms can be varied in a nonlinear fashion. Alternatively, the prism angles can also be varied, even though this also changes the angular emission properties of the backlight.

Figure 20:
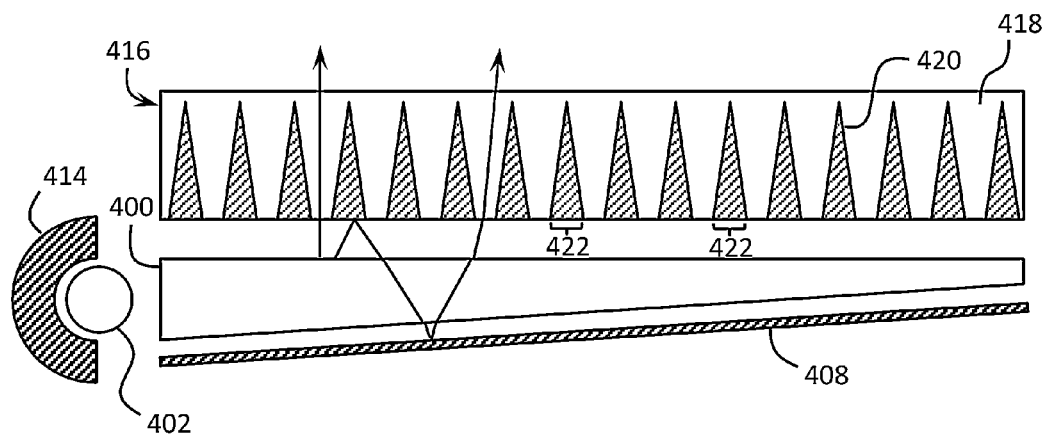
FIG. 20 is a cross sectional view of a directional backlight comprising an optical collimating film.

This approach incorporates a "collimating" optical film positioned on a conventional backlight unit, and the backlight unit is then incorporated into the immersive display. It is also possible to use lenses of other geometries, such as conical reflectors and simple lenslet arrays. A suitable "collimating" film can be a tapered reflector array film as illustrated in FIG. 20. As shown, the backlight of FIG. 20 includes light guide 400, reflector 408 positioned proximate a backside of the light guide relative to a position of a viewer of a display illuminated by the backlight, a light source 402, a second reflector 414 positioned about at least a portion of the light source to direct the light emitted by the light source into the light guide, and a collimating film 416 comprising a matrix film material 418 and inclusions (such as conical or pyramidal inclusions) 420 within the matrix material. While the matrix material is a transparent material (e.g. a transparent polymer material), the inclusions present a reflective surface 422 toward the backlight Modeling shows the "collimating" film can achieve an angular light distribution within ±30 degrees relative to a normal to the film surface. The angular light distribution range can also be tuned by changing parameters of the reflective inclusion. A conventional backlight combined with this film would provide an immersive display with no ghost image artifacts for both one-dimensional and two-dimensional tiling purposes. To modulate the brightness profile of the backlight, the density of light extraction features on the light guide can be modified.

Turning again to FIG. 6, it has also been found that the existence of the gap 224 may be employed for other useful purposes, such as to provide a volume in which to locate other display-related equipment. For example, viewers 16 will be interested in experiencing audio programming alone or in combination with visual images on the display system 200. In accordance with one or more embodiments, the display system 200 may employ one or more acoustic actuators 424 (see FIG. 6) coupled to the cover sheet 220. Actuators may, for instance be located in the bend portion of the cover glass on the top and bottom sides of the display. The acoustic actuators 424 operate to convert an audio signal into acoustic kinetic energy such that the cover sheet 220 operates as an acoustic membrane and projects the acoustic kinetic energy toward the viewer 16. Since there is an air gap between the cover glass and the display, the acoustic wave is not coupled into the display and the image itself will remain unaffected.

It is noted that when the cover sheet 220 is in contact with the display panels 210 (in areas away from the bezel 212), the audio energy may introduce a pressure wave into the display panels 210 sufficient to distort the quality of the displayed images. Accordingly, a minimum gap (e.g., a few hundreds of microns or more) may be introduced between the cover sheet 220 and the flat panel displays 210, which will eliminate any interaction between the vibrations of the cover sheet 220 and the display panels 210. In such case, the display system 200 would include one or more guiding rails (a frame) to hold the cover sheet 220 in position.

One particular embodiment may involve designing the system 100 such that the best visual experience is achieved when the viewer 16 sits close to the center of curvature of the cover sheet 220. In that case, the cover sheet 220 also acts as a sound antenna and the best audio experience will also be achieved when the viewer 16 is located at such center of curvature.

As discussed above, the display system 200 may compensate for the bezel-induced discontinuities when the viewer 16 is located within a certain range of permissible positions yielding controlled angles of vision, e.g., within a range from about 10 degrees to about 20 degrees. In some applications, such as marketing scenarios, one might be concerned about a potential customer approaching the display system 200 from an angle outside the desired range of viewing angles. Indeed, the potential customer might then see undesirable artifacts in the image and wrongly conclude that the display system 200 is of low quality. To compensate for such a scenario, one or more position sensing devices may operate to monitor whether a viewer 16 of the viewing planes is located within the range of permissible locations. The display system 200 may also employ a control circuit operating to: (i) permit the display of images when the one or more position sensing devices reveal that the viewer 16 is located within the range of permissible locations, and (ii) prohibit the display of images when the one or more position sensing devices reveal that the viewer 16 is not located within the range of permissible locations.

As noted above when discussing FIGS. 7A-7B, there are competing engineering characteristics involved with the selection of the apex angle of the prisms 240. The surface geometries of a prism 240 will direct incident light in two complementary directions about an axis, with one of the directions being a desirable direction and the other being undesirable and producing artifacts (such as ghosting) in the image. A number of alternative features may be employed to address the above issue.

One approach to compensating for ghosting is to employ image signal processing techniques and algorithms to provide correction in the pixel data used to drive the flat panel displays 210. If one considers one line of pixels of an image generated by the flat panel displays 210, such line can be represented as a 1×N vector V, which represents the intensity of the displayed image for that specific line. It is noted that there would be a respective vector V for each color, for example using the R, G and B approach. When the prisms 240 are introduced into the optical path, the perceived image by the viewer 16 will be another 1×N vector P, which will be a combination of the displayed image vector V plus a ghost image. The perceived image vector P will be given by the expression $P=(M+N)V$, where E and F are n×n square matrices. If there is no ghosting, the matrix M will be a unit matrix and the matrix N will be a zero matrix. When there is some ghosting, the matrices M and N are more far more complicated but may be readily be calculated using available algorithms.

Assuming that the desired pixel line of the image may be expressed by a vector K, then the image vector that needs to be created by the display panels is given by the following expression: $V=(M+N)^{-1}K$. Thus, the ghosting may be compensated for by calculating the matrices M and N and displaying an image vector K instead of the image V.

The above techniques have some limitations because the equations may lead to situations in which some elements of the vector V are negative, which is obviously a practical impossibility (negative images cannot be produced by the display). In such cases, the negative elements may be set, for instance, at zero. The problem is particularly important when displaying images that are mostly formed using a grey scale between, say zero and 255 (which is often used in displaying text). In addition, it is noted that the matrices M and N are a function of the viewing angle Va, and in a multiple viewer application, the matrices M and N would probably be calculated based on a single viewing angle (such as normal to the display), which may not be optimal for both viewers. In a single viewer application, such as gaming, the image algorithm may include an eye tracking system to locate the position of the viewer 16 in space and the matrices M and N may be recalculated in real time based on the information of the viewer position.

Another way to control the ghosting effect introduced by the prisms 240 is to permit the viewer 16 to eliminate optical compensation introduced by the prisms 240 at his/her will. Such a technique takes advantage of the fact that when the depth dimension G of the gap 224 is zero, the optical effects introduced by the prisms 240 no longer operate and the ghosting disappears.

Figure 21:
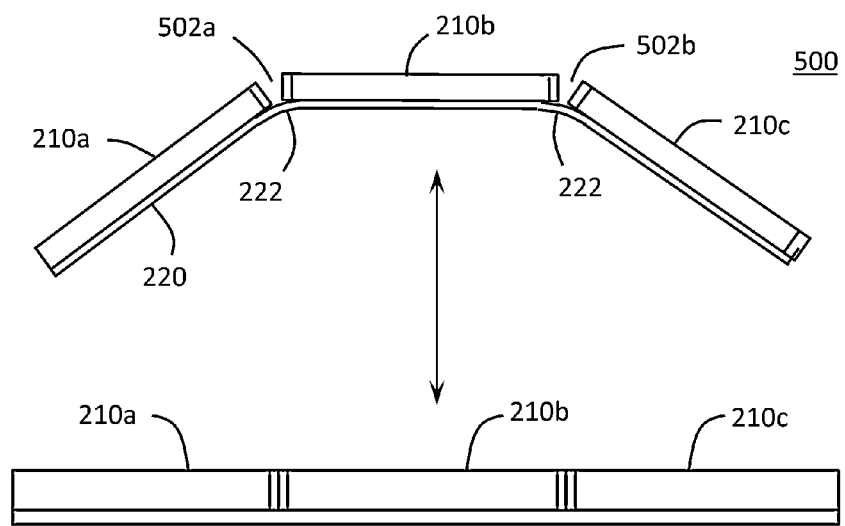
FIG. 21 is a top view (looking down) on an alternative system providing an enhanced viewing experience for a viewer in which tiled displays may be configurable for permitting and prohibiting compensation of bezel-induced discontinuities.

Reference is now made to FIG. 21, which illustrates a system 500 including some or all of the same features as discussed above with respect to the other embodiments. In the system 500, the cover sheet 220 is controlled such that it operates: (i) in a first mode to reduce the bezel-induced discontinuities (and possibly introducing ghosting), and (ii) in a second mode to perform substantially no reduction of the visual discontinuities (and therefore no ghosting). In particular, the system 500 may include a hinge mechanism 502a, 502b operating to permit the first, second, and third flat panel displays 210a, 201b, 201c to rotate with respect to one another along the respective peripheral edges thereof to reach positions corresponding to the aforementioned first and second modes.

When in the second mode, the light compensation portion of the cover sheet 220 is at a minimal distance from, and produces substantially no gap between a back side of the cover sheet 220 and, the respective peripheral areas and peripheral edges of the flat panel displays 210. Thus, any light leaving the flat panel displays 210 is not substantially bent by the light compensation portion 222, and thereby the system 500 does not operate to substantially reduce the bezel-induced discontinuities and does not operate to introduce any ghosting. In the first mode, however, the cover sheet 220 is in proximity to the peripheral edges of the flat panel displays 210 to produce a gap between the back side of the cover sheet 220 and the flat panel displays 210. Thus, the system 500 provides reduction in the bezel-induced discontinuities as well as the potential for some ghosting.

As can be seen in FIG. 21, the viewer 16 is given control over the hinge mechanism 502a, 502b such that he or she controls the flat panel displays 210 to rotate with respect to one another to achieve: (i) a first position whereby the viewing planes are substantially coplanar and define a substantially straight angle therebetween (the lower portion of the figure), and (ii) a second position whereby the viewing planes form an obtuse angle therebetween (the upper portion of the figure).

Figure 22A:
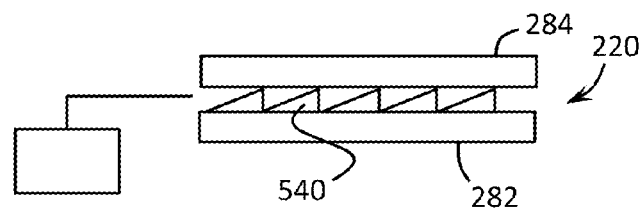
FIGS. 22A and 22B show schematic diagrams of cover sheet configurations that may be used to enable tiled displays to be configurable for permitting and prohibiting compensation of bezel-induced discontinuities.
Figure 22B:
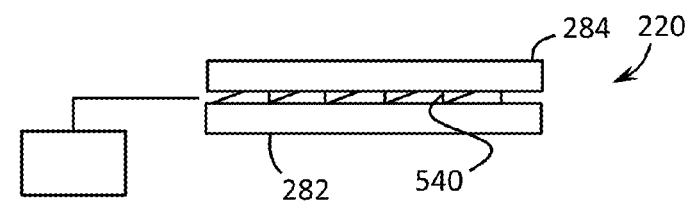

Reference is now made to FIGS. 22A and 22B, which are schematic diagrams illustrating alternative ways to control the ghosting effect introduced by the prisms 240. In these embodiments, the system would include some or all of the features discussed above with respect to the other embodiments, with the exception of also including an alternative design for the cover sheet 220. In these embodiments, the cover sheet 220 includes a first sheet 282 having front and back surfaces, and a second sheet 284 also having front and back surfaces. The first and second sheets 282, 284 are spaced apart from, and movable with respect to, one another along a normal axis to both sheets. A plurality of deformable prisms 540 is disposed on at least one of the first and second sheets 282, 284 such that they are located between the first and second sheets. By way of example, the deformable prisms 540 may be formed from a resilient material, such as silicone.

In the first mode, illustrated in FIG. 22A, the first and second sheets 282, 284 are spaced sufficiently apart from one another along the normal axis such that each of the deformable prisms 540 is permitted to exhibit a respective apex angle and other suitable optical properties to bend light as discussed above. In the second mode, shown in FIG. 22B, however, the first and second sheets 282, 284 are not substantially spaced apart from one another along the normal axis. Indeed, each of the deformable prisms 540 is deformed to such an extent that they do not exhibit an apex angle or other optical properties to bend light. Therefore, in the first mode, the deformable prisms 540, owing to a lack of deformation, operate to reduce the bezel-induced discontinuities; however, in the second mode, the prisms 540 are deformed and cannot operate to perform any reduction in the bezel-induced discontinuities and also cannot produce any ghosting.

One approach to providing the viewer with control over the positions of the sheets 282, 284 is to seal one or more edges thereof and permit the application of positive/negative pressures within the space between the sheets to change the modes of operation. For example, at least one of: (i) application of a vacuum therebetween, and (ii) removal of gas pressure therebetween, may operate to cause the first and second sheets 282, 284 to move toward one another along the normal axis such that each of the deformable prisms 540 is deformed. Additionally or alternatively, at least one of: (i) removal of the vacuum therebetween, and (ii) introduction of gas pressure therebetween, may operate to cause the first and second sheets 282, 284 to move away from one another along the normal axis such that each of the deformable prisms 540 is permitted to assume a substantially non-deformed shape.

Figure 23:
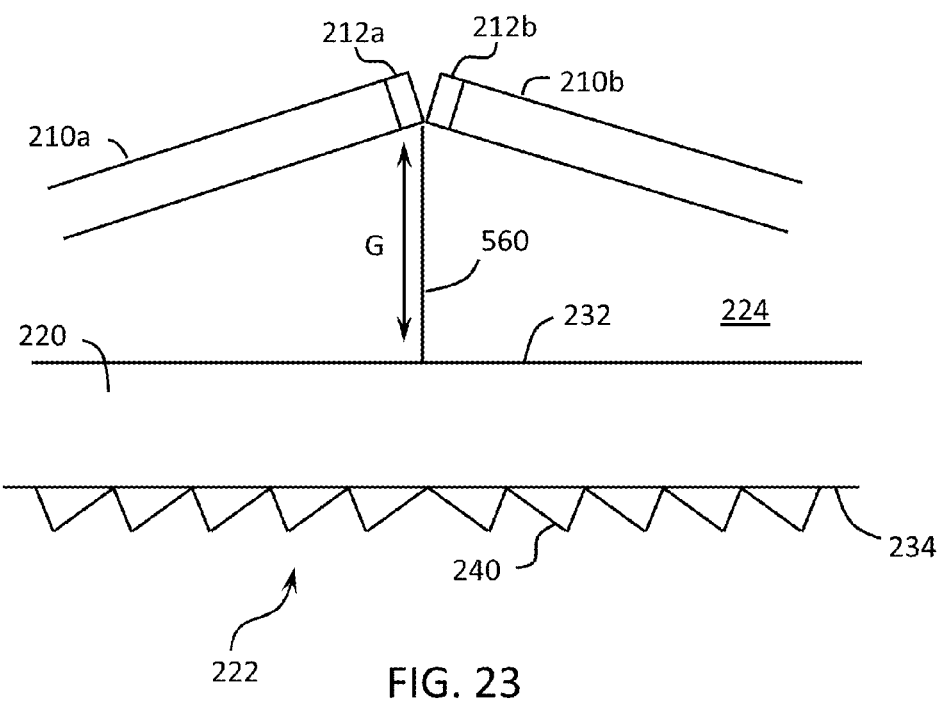
FIG. 23 illustrates another embodiment of the light compensating portion of a cover sheet arranged adjacent the peripheral edges of tiled displays utilizing a baffle positioned in the gap between adjacent displays.

In still another embodiment shown in FIG. 23, the curvature of the light compensation portion of the cover sheet 220 and the proximity thereof to the adjacent peripheral edges 212a, 212b of the first and second flat panel displays 210a and 210b produces a gap G between the back side 232 of the cover sheet 220 and the respective peripheral edges 212a, 212b of the first and second flat panel displays 210a and 210b. A baffle 560 can be positioned within the gap that extends from the back side of the cover sheet to a position proximate the adjacent peripheral edges (e.g. where the peripheral edges intersect). The baffle may be translucent, but the baffle is more effective if it is opaque. The presence of the baffle prevents light rays from one flat panel display mixing with light rays from an adjacent flat panel display, and can reduce ghosting.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

What is claimed is:

1. A display apparatus, comprising:
a first flat panel display having a peripheral edge and a first viewing plane;
a second flat panel display having a peripheral edge and a second viewing plane, where the first and second flat panel displays: (i) are arranged adjacent to one another along the respective peripheral edges thereof, and (ii) form an obtuse angle T between the respective first and second viewing planes, where T is greater than 0 degrees and equal to or less than 180 degrees; and
a cover sheet located in proximity to, and covering the first and second viewing planes, and including a light compensation portion that: (i) is located proximate to the peripheral edges of the first and second flat panel displays, and (ii) has a curvature complementary to the obtuse angle between the respective first and second viewing planes, where a radius of curvature R of the curvature of the light compensation portion extends from a point spaced away from the display apparatus and toward the curvature of the cover sheet located adjacent to the respective peripheral edges of the first and second flat panel displays;
wherein the light compensation portion operates to bend at least some light produced by respective peripheral areas of the first and second flat panel displays proximate to the respective peripheral edges thereof to reduce visual discontinuities introduced by such peripheral edges into an image displayed on the first and second flat panel displays.

2. The display apparatus of claim 1, wherein:
the curvature of the light compensation portion of the cover sheet and the proximity thereof to the peripheral edges of the first and second flat panel displays produces: (i) a gap between a back side of the cover sheet and the respective peripheral areas and peripheral edges of the first and second flat panel displays, and (ii) no gap between the back side of the cover sheet the first and second flat panel displays in central areas outside the respective peripheral areas.

3. A display apparatus, comprising:
a first flat panel display having a peripheral edge and a first viewing plane;
a second flat panel display having a peripheral edge and a second viewing plane, where the first and second flat panel displays: (i) are arranged adjacent to one another along the respective peripheral edges thereof, and (ii) form an obtuse angle T between the respective first and second viewing planes, where T is greater than 0 degrees and equal to or less than 180 degrees; and
a cover sheet located in proximity to, and covering the first and second viewing planes, and including a light compensation portion that: (i) is located proximate to the peripheral edges of the first and second flat panel displays, and (ii) has a curvature complementary to the obtuse angle between the respective first and second viewing planes;
wherein the light compensation portion operates to bend at least some light produced by respective peripheral areas of the first and second flat panel displays proximate to the respective peripheral edges thereof to reduce visual discontinuities introduced by such peripheral edges into an image displayed on the first and second flat panel displays, and
wherein the light compensation portion includes a plurality of prisms disposed on at least one of a front side and a back side of the cover sheet, each prism of the plurality of prisms including at least one respective apex angle defining a deviation angle for such prism.

4. The display apparatus of claim 3, wherein one of:
the respective apex angle of each prism of the plurality of prisms is substantially the same, within a prescribed range of permissible apex angles; and the respective apex angle of each prism of the plurality of prisms varies as a function of a distance of such prism from the peripheral edges of the first and second flat panel displays, such that the respective apex angle is: (i) at a maximum when the distance is at a maximum, and (ii) decreases to zero as the distance decreases.

5. The display apparatus of claim 4, wherein the range of permissible apex angles for each prism of the plurality of prisms is in a range from about 20 to about 50 degrees.

6. The display apparatus of claim 1, wherein at least one of:
the curvature of the light compensation portion of the cover sheet and the proximity thereof to the peripheral edges of the first and second flat panel displays produces a gap between the back side of the cover sheet and the respective peripheral areas and peripheral edges of the first and second flat panel displays;
the gap includes a depth dimension G extending along a normal axis from the back side of the cover sheet to a reference axis central to, or at an intersection of, the peripheral edges of the first and second flat panel displays;
a minimum of the depth dimension G of the gap is proportional to 1/(TAN(Da−Va)), where Da is the deviation angle of each prism, and Va is a viewing angle from a point of view of a viewer in a direction toward the peripheral edges of the first and second flat panel displays; and
the minimum depth dimension G of the gap is proportional to B/(TAN(Da−Va)), where B is a width of the peripheral areas measured perpendicular to the respective peripheral edges of the first and second flat panel displays.

7. The display apparatus of claim 6, wherein the radius of curvature R of the light compensation portion of the cover sheet is expressed by the following expression: R is proportional to: $G \times ((COS(90-T/2))^{-1}-1)$, where G is the depth dimension of the gap, and T is the obtuse angle between the respective first and second viewing planes.

8. The display apparatus of claim 7, wherein the radius of curvature R of the light compensation portion of the cover sheet is constrained such that $R \times TAN(90-T/2) \geq L/2$, where L is a width of the flat panel displays.

9. The display apparatus of claim 2, further comprising one or more acoustic actuators located within the gap and coupled to the back side of the cover sheet, wherein the acoustic actuators operate to convert an audio signal into acoustic kinetic energy such that the cover sheet operates as an acoustic membrane and projects the acoustic kinetic energy toward a viewer of the viewing planes.

10. The display apparatus of claim 1, further comprising:
one or more position sensing devices operating to monitor whether a viewer of the viewing planes is located within a range of permissible locations, which ensure that the light compensation portion significantly reduces the visual discontinuities introduced by the respective peripheral edges of the first and second flat panel displays; and
a control circuit operating to: (i) permit a display of images by the first and second flat panel displays when the one or more position sensing devices reveal that the viewer is located within the range of permissible locations, and (ii) prohibit the display of images by the first and second flat panel displays when the one or more position sensing devices reveal that the viewer is not located within the range of permissible locations.

11. The display apparatus of claim 1, wherein the curvature of the light compensation portion of the cover sheet and the proximity thereof to the peripheral edges of the first and second flat panel displays produces a gap between a back side of the cover sheet and the respective peripheral areas and peripheral edges of the first and second flat panel displays, and wherein a baffle extends across the gap from the back side of the cover sheet to a position proximate the adjacent peripheral edges of the first and second flat panel displays.

12. The display apparatus of claim 1, wherein the first and second flat panel displays further comprise a directional backlight.

13. The display apparatus of claim 12, wherein the directional backlight comprises a prismatic film positioned on the directional backlight.

14. The display apparatus of claim 1, wherein light emitted by at least one of the first and second displays is emitted in a non-perpendicular direction $\beta$ with respect to the viewing plane thereof.

15. The display apparatus of claim 1, wherein light emitted by at least one of the first and second displays is emitted in a direction $\beta$ with respect to the viewing plane thereof and at least 50% of the light is emitted in a cone having an half angle smaller than 40 degrees centered around the direction $\beta$.

16. A display apparatus, comprising:
a first flat panel display having a peripheral edge and a first viewing plane;
a second flat panel display having a peripheral edge and a second viewing plane where the first and second flat panel displays: (i) are arranged adjacent to one another along the respective peripheral edges thereof, and (ii) form an obtuse angle T between the respective first and second viewing planes, where T is greater than 0 degrees and equal to or less than 180 degrees; and
a cover sheet located in proximity to, and covering the first and second viewing planes, and including a controllable light compensation portion that: (i) is located proximate to the peripheral edges of the first and second flat panel displays, (ii) operates in a first mode to bend at least some light produced by respective peripheral areas of the first and second flat panel displays proximate to the respective peripheral edges thereof to reduce visual discontinuities introduced by such peripheral edges into an image displayed on the first and second flat panel displays, and (iii) operates in a second mode to perform substantially no reduction of the visual discontinuities.

17. The display apparatus of claim 16, further comprising:
a hinge mechanism operable to: (i) arrange the first and second flat panel displays adjacent to one another along the respective peripheral edges thereof, and (ii) permit the first and second flat panel displays to rotate with respect to one another along the respective peripheral edges thereof, wherein:
in the second mode, the light compensation portion of the cover sheet is at a minimal distance from, and produces substantially no gap between a back side of the cover sheet and, the respective peripheral areas and peripheral edges of the first and second flat panel displays, such that any light leaving the respective peripheral areas of the first and second flat panel displays is not substantially bent by the light compensation portion, and thereby the light compensation portion of the cover sheet does not operate in the second mode to substantially reduce the visual discontinuities; and in the first mode, the light compensation portion of the cover sheet is in proximity to the peripheral edges of the first and second flat panel displays to produce a gap between the back side of the cover sheet and the respective peripheral areas and peripheral edges of the first and second flat panel displays, such that at least some light leaving the respective peripheral areas of the first and second flat panel displays is substantially bent by the light compensation portion, and thereby the light compensation portion of the cover sheet operates in the first mode to substantially reduce the visual discontinuities.

18. The display apparatus of claim 17, wherein the hinge mechanism is operable to permit the first and second flat panel displays to rotate with respect to one another along the respective peripheral edges thereof between: (i) a first position whereby the first and second viewing planes are substantially coplanar and define a substantially straight angle therebetween, and (ii) a second position whereby the first and second viewing planes form an obtuse angle therebetween.

19. The display apparatus of claim 16, wherein the cover sheet further comprises:

a first sheet having front and back surfaces;

a second sheet having front and back surfaces, where the first and second sheets are spaced apart from and movable with respect to one another along a normal axis to both sheets; and a plurality of deformable prisms disposed on at least one of the first and second sheets such that they are located between the first and second sheets.

20. The display apparatus of claim 19, wherein:

in the first mode, the first and second sheets are sufficiently spaced apart from one another along the normal axis such that each of the deformable prisms are permitted to exhibit at least one respective apex angle defining a refraction angle for such prism; and in the second mode, the first and second sheets are not substantially spaced apart from one another along the normal axis such that each of the deformable prisms is deformed to such an extent that each prism does not exhibit an apex angle defining a refraction angle for such prism.

* * * * *